(12) United States Patent
Tsukamoto (10) Patent No.: US 10,491,054 B2
(45) Date of Patent: Nov. 26, 2019

(54) COIL POSITION DETECTION METHOD FOR NON-CONTACT POWER SUPPLY SYSTEM, AND POWER RECEPTION DEVICE

(71) Applicant: NISSAN MOTOR CO., LTD., Yokohama-shi, Kanagawa (JP)

(72) Inventor: Yukinori Tsukamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/302,334

(22) PCT Filed: May 18, 2016

(86) PCT No.: PCT/JP2016/064750
§ 371 (c)(1),
(2) Date: Nov. 16, 2018

(87) PCT Pub. No.: WO2017/199374
PCT Pub. Date: Nov. 23, 2017

(65) Prior Publication Data
US 2019/0296592 A1 Sep. 26, 2019

(51) Int. Cl.
*H02J 50/90* (2016.01)
*H01F 38/14* (2006.01)
(Continued)

(52) U.S. Cl.
CPC .............. *H02J 50/90* (2016.02); *B60L 53/12* (2019.02); *H02J 7/025* (2013.01); *H02J 50/10* (2016.02)

(58) Field of Classification Search
CPC . H02J 50/90; H02J 50/10; H02J 7/025; B60L 53/12
See application file for complete search history.

(56) References Cited

U.S. PATENT DOCUMENTS

2008/0169706 A1* 7/2008 Onishi .................... H02J 7/025
307/104
2014/0145517 A1* 5/2014 Ogasawara ............ H02J 5/005
307/104

(Continued)

FOREIGN PATENT DOCUMENTS

JP 4849190 B2 1/2012
JP 2014-57458 A 3/2014

(Continued)

*Primary Examiner* — Rexford N Barnie
*Assistant Examiner* — Thai H Tran
(74) *Attorney, Agent, or Firm* — Foley & Lardner LLP (57) ABSTRACT

Provided is a coil position detection method for a non-contact power supply system, configured to supply power from a power transmission coil on a ground side to a power reception coil on a vehicle side, by which a position of the power reception coil is detected. Output terminals of a rectifier circuit configured to rectify AC power received by the power reception coil are connected to a drive circuit and a battery. Moreover, a relay switch is provided between the battery and one of the output terminals of the rectifier circuit. When the relay switch is on, the coil position is detected based on AC voltage detected by a first voltmeter provided upstream of the rectifier circuit and, when the relay switch is off, the coil position is detected based on DC voltage detected by a second voltmeter provided downstream of the rectifier circuit.

3 Claims, 9 Drawing Sheets (51) Int. Cl.
*B60L 53/12* (2019.01)
*H02J 7/02* (2016.01)
*H02J 50/10* (2016.01)

(56) References Cited

U.S. PATENT DOCUMENTS

2015/0224883 A1  8/2015  Ichikawa et al.
2018/0093570 A1  4/2018  Ichikawa

FOREIGN PATENT DOCUMENTS

JP     2015-116023 A    6/2015
JP     2016-067149 A    4/2016

\* cited by examiner

COIL POSITION DETECTION METHOD FOR NON-CONTACT POWER SUPPLY SYSTEM, AND POWER RECEPTION DEVICE

TECHNICAL FIELD

The present invention relates to a coil position detection method for a non-contact power supply system and to a power reception device.

BACKGROUND ART

In a non-contact power supply system which contactlessly supplies power to a battery mounted in an electric vehicle or the like, a power transmission coil provided on the ground and a power reception coil mounted in the vehicle are arranged to face each other and the power transmission coil is excited to supply power to the power reception coil. In such a non-contact power supply system, the power reception coil needs to be aligned to face the power transmission coil; and a system disclosed in Patent Literature 1 has been conventionally known.

In Patent Literature 1, the power transmission coil is excited at lower voltage than normal power supply voltage and power received by the power reception coil is detected to determine whether the power reception coil is present at a desired position relative to the power transmission coil.

CITATION LIST

Patent Literature

Patent Literature 1: Japanese Patent No. 4849190

SUMMARY OF INVENTION

In the conventional example disclosed in Patent Literature 1, relays are provided upstream of a battery and a drive circuit. When the power reception coil is to be aligned, the relays need to be turned off to accurately detect the voltage to be detected at the power reception coil.

The present invention has been made to solve the conventional problem described above and an object thereof is to provide a coil position detection method for a non-contact power supply system and a power reception device which enable accurate alignment of a power reception coil without switching a relay during the alignment.

In a coil position detection method of one aspect of the present invention, when a relay circuit is on, a coil position is detected based on alternating current (AC) voltage detected upstream of a rectifier circuit configured to rectify AC power received by the power reception coil, the relay circuit provided between a battery and the rectifier circuit as well as a drive circuit connected to the rectifier circuit. Moreover, when the relay circuit is off, the coil position is detected based on direct current (DC) voltage detected downstream of the rectifier circuit.

A power reception device of one aspect of the present invention includes a coil position detection circuit configured to detect a position of the power reception coil by detecting voltage of power received by the power reception coil when the power transmission coil is excited. The coil position detection circuit detects the position of the power reception coil based on AC voltage detected upstream of the rectifier circuit when the relay circuit is on and detects the position of the power reception coil based on DC voltage detected downstream of the rectifier circuit when the relay circuit is off.

Advantageous Effects of Invention

In the present invention, it is possible to accurately align the power reception coil without switching the relay circuit during the alignment.

DESCRIPTION OF EMBODIMENT

Figure 1:
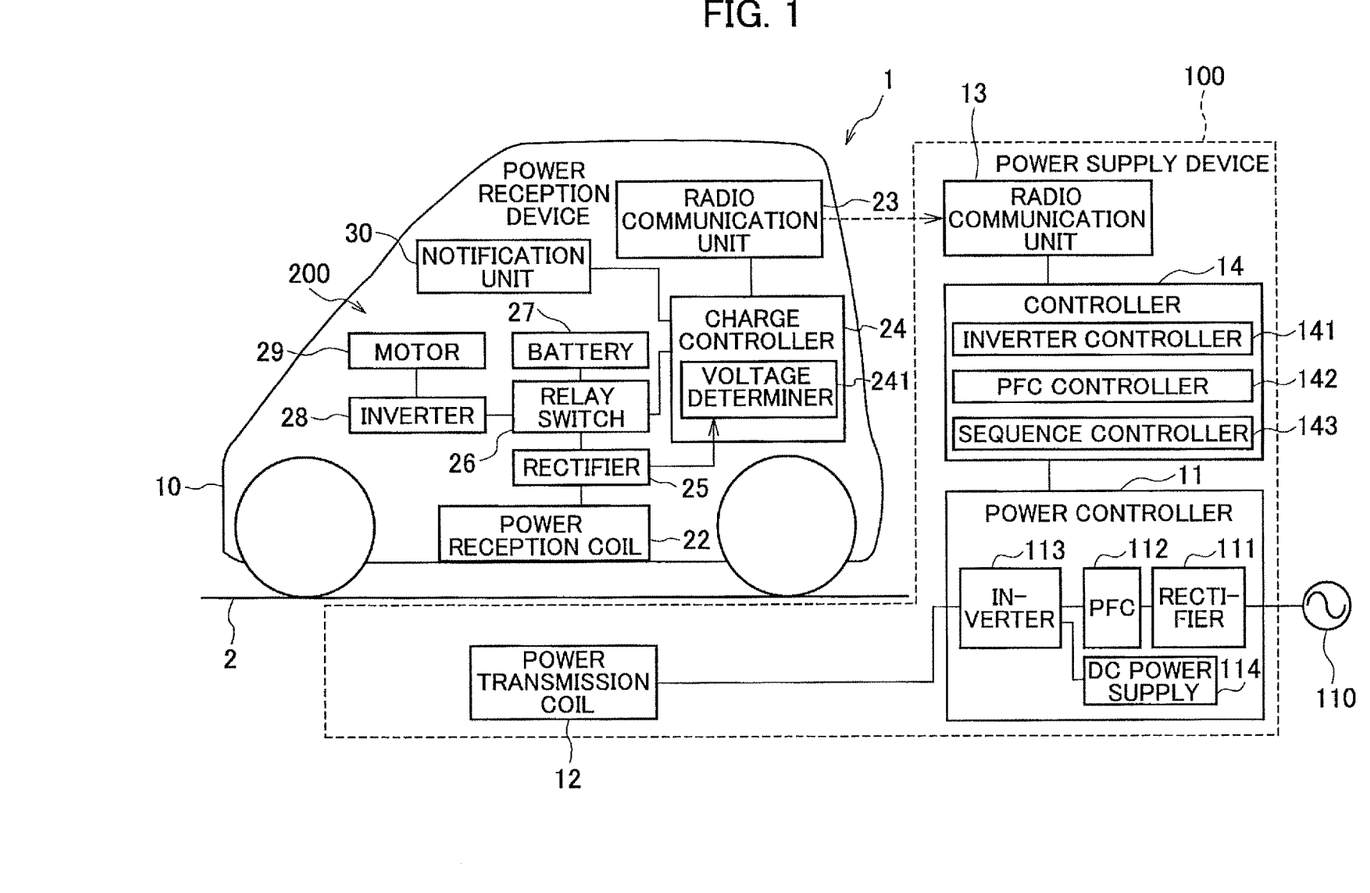
FIG. 1 is a block diagram illustrating a configuration of a non-contact power supply system employing a coil position detection method according to one embodiment of the present invention.

An embodiment of the present invention is described below with reference to the drawings. [Configuration of Non-contact Power Supply System]FIG. 1 is a block diagram illustrating a configuration of a non-contact power supply system employing a coil position detection method according to the embodiment. As illustrated in FIG. 1, the non-contact power supply system 1 includes a power supply device 100 which is a ground-side unit and a power reception device 200 which is a vehicle-side unit. The non-contact power supply system 1 contactlessly supplies power from the power supply device 100 disposed in a power supply station or the like to the power reception device 200 mounted in a vehicle 10 such as an electric vehicle or a hybrid car to charge a battery mounted in the vehicle.

The power supply device 100 includes a power transmission coil 12 disposed in a parking space 2 near the power supply station. Meanwhile, the power reception device 200 includes a power reception coil 22 installed on a bottom surface of the vehicle 10. The power reception coil 22 is disposed to face the power transmission coil 12 when the vehicle 10 is stopped at a predetermined position (power suppliable position to be described later) in the parking space 2.

The power transmission coil 12 includes a primary coil made of electrically-conductive wires and transmits power to the power reception coil 22. The power reception coil 22 includes a secondary coil similarly made of electrically-conductive wires and receives power from the power transmission coil 12. Power can be contactlessly supplied from the power transmission coil 12 to the power reception coil 22 by means of electromagnetic induction between the coils.

The power supply device 100 on the ground side includes a power controller 11, the power transmission coil 12, a radio communication unit 13, and a controller 14.

The power controller 11 is a circuit which converts AC power received from an AC power supply 110 to high-frequency AC power and transmits the high-frequency AC power to the power transmission coil 12. Moreover, the power controller 11 includes a rectifier 111, a PFC circuit 112, a DC power supply 114, and an inverter 113.

The rectifier 111 is a circuit which is electrically connected to the AC power supply 110 and rectifies the AC power outputted from the AC power supply 110. The PFC circuit 112 is a circuit for improving a power factor by shaping a waveform of the power outputted from the rectifier 111 (Power Factor Correction) and is connected between the rectifier 111 and the inverter 113.

The inverter 113 includes a PWM control circuit formed of a switching element such as an IGBT. The inverter 113 converts DC power to AC power based on a switching control signal and supplies the AC power to the power transmission coil 12. The DC power supply 114 outputs DC voltage used to very weakly excite (details are described later) the power transmission coil 12.

The radio communication unit 13 performs bidirectional communication with a radio communication unit 23 provided on the vehicle 10 side.

The controller 14 controls the entire power supply device 100 and includes an inverter controller 141, a PFC controller 142, and a sequence controller 143. The controller 14 performs parking position determination processing when the vehicle 10 is to be parked in the parking space 2. In this case, the PFC controller 142 generates an excitation power instruction for the power transmission coil 12 and the inverter controller 141 generates a frequency instruction and a duty for the excitation power to control the inverter 113. The controller 14 thereby transmits power for determining the parking position from the power transmission coil 12 to the power reception coil 22. As described later, when the parking position determination processing is performed, the power transmission coil 12 is very weakly or weakly excited (in both cases, the power transmission coil 12 is excited more weakly than in normal charging) to transmit power for parking position determination. Moreover, the sequence controller 143 exchanges sequence information with the power reception device 200 via the radio communication unit 13.

Meanwhile, the power reception device 200 on the vehicle 10 side includes the power reception coil 22, the radio communication unit 23, a charge controller 24, a rectifier 25, a relay switch 26 (relay circuit), a battery 27, an inverter 28, a motor 29, and a notification unit 30.

The power reception coil 22 is disposed at such a position that the power reception coil 22 is located directly above the power transmission coil 12 to face it and the distance to the power transmission coil 12 is a predetermined value when the vehicle 10 is parked at a predetermined stop position in the parking space 2.

The radio communication unit 23 performs bidirectional communication with the radio communication unit 13 provided on the power supply device 100 side The charge controller 24 is a controller for controlling charging of the battery 27 and includes a voltage determiner 241. Particularly, the charge controller 24 performs the parking position determination processing when the vehicle 10 is to be parked in the parking space 2. In this case, the voltage determiner 241 monitors the power received at the power reception coil 22. Then, the voltage determiner 241 detects the position of the power reception coil 22 based on the voltage of the power received by the power reception coil 22 when the power transmission coil 12 is excited. Specifically, the charge controller 24 has a function of a coil position detection circuit which detects the position of the power reception coil 22 by detecting the voltage of the power received by the power reception coil 22 when the power transmission coil 12 is excited. Details of the parking position determination processing are described later. Moreover, the charge controller 24 controls the radio communication unit 23, the notification unit 30, the relay switch 26, and the like and transmits a signal indicating start of the charging to the controller 14 of the power supply device 100 via the radio communication unit 23.

The rectifier 25 is connected to the power reception coil 22. The rectifier 25 rectifies AC power received by the power reception coil 22 to DC power and outputs the DC power to the battery 27 or the inverter 28. Details of the rectifier 25 are described later with reference to FIG. 2.

The relay switch 26 can be switched on and off by the control of the charge controller 24. Moreover, turning off the relay switch 26 can electrically separate the battery 27 from the rectifier 25. The battery 27 is formed by connecting multiple secondary cells and is a power source of the vehicle 10.

The inverter 28 includes a PWM control circuit formed of a switching element such as an IGBT. The inverter 28 converts DC power outputted from the battery 27 to AC power based on the switching control signal and supplies the AC power to the motor 29.

The motor 29 is formed of, for example, a three-phase AC electric motor and is used as a drive source for driving the vehicle 10.

The notification unit 30 includes a warning lamp, a display or a speaker of a navigation system, or the like and outputs light, an image, audio voice, or the like to the user based on the control of the charge controller 24.

The aforementioned configuration allows the non-contact power supply system 1 to transmit and receive high-frequency power in a non-contact state by means of electromagnetic induction between the power transmission coil 12 and the power reception coil 22. Specifically, supplying power to the power transmission coil 12 causes magnetic coupling between the power transmission coil 12 and the power reception coil 22 and power is thus supplied from the power transmission coil 12 to the power reception coil 22.

[Description of Very Weak Excitation and Weak Excitation]

When the vehicle 10 is to be parked in the parking space 2 and the non-contact power supply is to be performed, the non-contact power supply system 1 according to the embodiment performs the parking position determination processing to determine whether the vehicle 10 reaches a parking position at which the power supply is possible. In the following description, a parking position at which the power transmitted by the power transmission coil 12 can be received by the power reception coil 22 and supplied to the battery 27 is referred to as "power suppliable position." Specifically, when the vehicle 10 is parked at the power suppliable position in the parking space 2, the power transmission coil 12 and the power reception coil 22 are at positions facing each other. In detail, the coupling coefficient between the power transmission coil 12 and the power reception coil 22 reaches a certain coupling coefficient (hereafter, referred to as "allowable coupling coefficient"). Here, the "coupling coefficient" refers to a proportion of magnetic flux linked with the power reception coil 22 to magnetic flux outputted by the excitation of the power transmission coil 12. Accordingly, the coupling coefficient is greatest when the power transmission coil 12 and the power reception coil 22 directly face each other. Moreover, the "allowable coupling coefficient" refers to the minimum coupling coefficient required to perform the non-contact power supply.

In the parking position determination processing, when the non-contact power supply system 1 detects that the vehicle 10 is approaching the power suppliable position, the non-contact power supply system 1 supplies very weak power to the power transmission coil 12 as power for determination and very weakly excites the power transmission coil 12. Then, when the voltage of the power received by the power reception coil 22 and detected by a first voltmeter 51 exceeds preset first threshold voltage Vth1 while the power transmission coil 12 is very weakly excited, the non-contact power supply system 1 supplies weak power greater than the aforementioned very weak power to the power transmission coil 12 to weakly excite the power transmission coil 12. For example, assume a case where the vehicle 10 approaches the power suppliable position in the parking space 2 and the power reception coil 22 thereby partially overlaps the power transmission coil 12 to cause voltage to be generated in the power reception coil 22. In this case, when the voltage reaches the first threshold voltage Vth1, the non-contact power supply system 1 switches the excitation of the power transmission coil 12 from the very weak excitation to the weak excitation. Moreover, assume a case where the vehicle is stopped and the relay switch 26 is off. In this case, when voltage detected by a second voltmeter 52 exceeds third threshold voltage Vth3, the non-contact power supply system 1 weakly excites the power transmission coil 12. The reason for separately using the first voltmeter 51 and the second voltmeter 52 depending on the situation is described later.

When the power transmission coil 12 is weakly excited and then the voltage detected by the first voltmeter 51 exceeds preset second threshold voltage Vth2, the non-contact power supply system 1 determines that the vehicle 10 reaches the power suppliable position. In other words, the non-contact power supply system 1 determines that the coupling coefficient between the power transmission coil 12 and the power reception coil 22 reaches the allowable coupling coefficient. Moreover, in the case where the vehicle is stopped and the relay switch 26 is off, when the voltage detected by the second voltmeter 52 is higher than fourth threshold voltage Vth4, the non-contact power supply system 1 determines that the vehicle 10 has reached the power suppliable position. The reason for switching the excitation of the power transmission coil 12 from the very weak excitation to the weak excitation is described below.

When the vehicle 10 is approaching the power suppliable position, there are risks that a person approaches the power transmission coil 12 installed at an appropriate position in the parking space 2 and that a metal foreign object is placed near the power transmission coil 12. Since the human body and the foreign object may be affected when the power transmission coil 12 excited, it is desirable to excite the power transmission coil 12 as weakly as possible. Accordingly, when the vehicle 10 is present at a position away from the parking space 2, the power transmission coil 12 is very weakly excited.

Meanwhile, when the power transmission coil 12 is very weakly excited, the voltage of the power received by the power reception coil 22, that is the detected voltage is very low. Accordingly, it is difficult to accurately measure the voltage generated in the power reception coil 22 by using a low-cost detection device which is generally used. A high-performance detection device is required for this measurement. The problem of requiring the high-performance detection device is avoided by switching the excitation from the very weak excitation to the weak excitation when the received power voltage reaches the first threshold voltage Vth1. Note that, when the excitation is switched from the very weak excitation to the weak excitation, the vehicle 10 is close to the power suppliable position of the parking space 2. Accordingly, there is only a small possibility of occurrence of problems such as approaching of a person and placing of a metal foreign object.

[Description of Measurement of Received Power Voltage]

Figure 2:
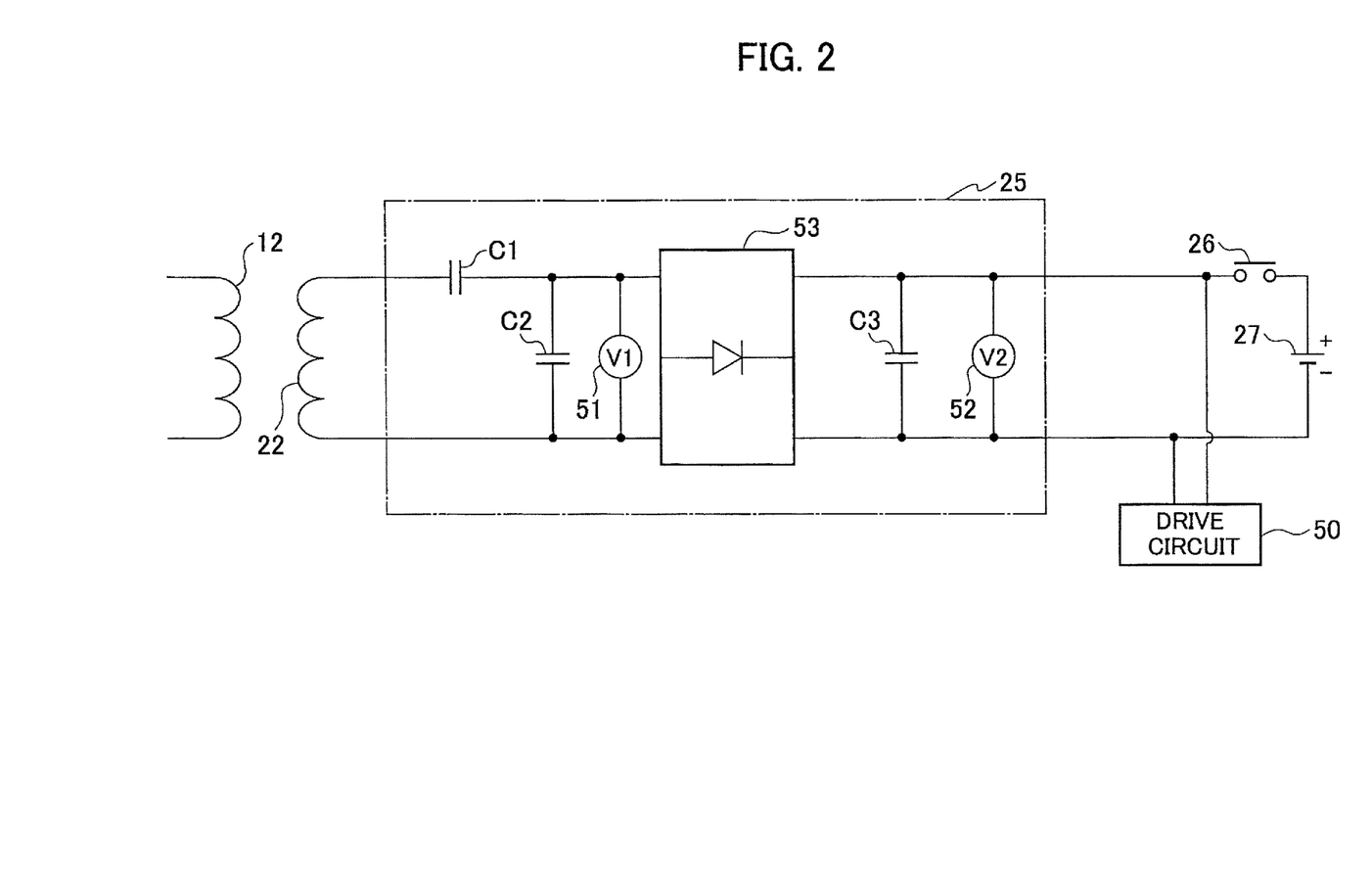
FIG. 2 is a circuit diagram illustrating a rectifier and peripheral devices of the rectifier in the non-contact power supply system employing the coil position detection method according to one embodiment of the present invention.

Next, measurement of the voltage of the power received by the power reception coil 22 is described with reference to a circuit diagram illustrated in FIG. 2. FIG. 2 is a circuit diagram illustrating details of the rectifier 25 illustrated in FIG. 1 and peripheral devices of the rectifier 25. As illustrated in FIG. 2, the rectifier 25 includes a rectifier circuit 53, capacitors C1 to C3, the first voltmeter 51, and the second voltmeter 52. The power reception coil 22 is connected to input terminals of the rectifier circuit 53 via the capacitors C1 and C2. The rectifier circuit 53 is formed of; for example, a diode bridge circuit and converts the AC voltage of the power received by the power reception coil 22 to the DC voltage. Moreover, the first voltmeter 51 which measures the AC voltage of the power received by the power reception coil 22 is provided between the input terminals (upstream) of the rectifier circuit 53.

Meanwhile, the second voltmeter 52 which measures the DC voltage outputted by the rectifier circuit 53 is provided between output terminals (downstream) of the rectifier circuit 53. Moreover, the smoothing capacitor C3 is connected to the output terminals of the rectifier circuit 53 and is also connected to the battery 27 via the relay switch 26. Furthermore, a drive circuit 50 is connected upstream of the relay switch 26. The drive circuit 50 corresponds to the inverter 28 and the motor 29 in FIG. 1. Detection data of the first voltmeter 51 and detection data of the second voltmeter 52 are outputted to the voltage determiner 241 illustrated in FIG. 1.

Moreover, in the embodiment, when the parking position determination processing is performed with the power transmission coil 12 very weakly excited and weakly excited, the voltage is detected with the voltmeter to be used being switched between the first voltmeter 51 and the second voltmeter 52. Specifically, when the vehicle 10 is stopped and the relay switch 26 is of X the voltage (DC voltage) detected by the second voltmeter 52 is used. Meanwhile, when the relay switch 26 is on and the vehicle 10 is traveling, the voltage (AC voltage) detected by the first voltmeter 51 is used.

Description is given below of the reason for switching the voltmeter to be used between the first voltmeter 51 and the second voltmeter 52 depending on whether the vehicle 10 is traveling or is stopped.

When the vehicle 10 is traveling, the relay switch 26 is set to on to supply the power to the drive circuit 50. Accordingly, the voltage of the battery 27 is applied to the second voltmeter 52. Thus, when the power transmission coil 12 is very weakly excited or weakly excited and the voltage of the power received by the power reception coil 22 is measured by the second voltmeter 52, the voltage of the power received by the power reception coil 22 is added to the voltage of the battery 27. Since the voltage of the power received by the power reception coil 22 is far smaller than the output voltage of the battery 27, it is difficult to accurately detect the voltage received by power reception coil 22 by using the second voltmeter 52.

Meanwhile, in the first voltmeter 51 provided upstream of the rectifier circuit 53, only the voltage of the power received by the power reception coil 22 is generated and no output voltage of the battery 27 is applied thereto. Accordingly, when the relay switch 26 is on, the voltage determiner 241 illustrated in FIG. 1 measures the voltage detected by the first voltmeter 51 and performs the parking position determination processing by using the measured voltage.

When the vehicle 10 is stopped, the relay switch 26 is off and the battery 27 is electrically separated from the second voltmeter 52. Moreover, voltage charged in the smoothing capacitor C3 is discharged by a not-illustrated discharging device. Accordingly, when the power transmission coil 12 is very weakly excited or weakly excited, the voltage of the power received by the power reception coil 22 can be measured by using the second voltmeter 52.

Moreover, since the relay switch 26 is off and the smoothing capacitor C3 is discharged when the vehicle 10 is stopped, changes in the charging states of the capacitors C1 and C2 and the temperature of a diode used in the rectifier circuit 53 cause the voltage generated at the input terminals of the rectifier 25 to be unstable. Thus, accurate voltage measurement cannot be performed by measuring the voltage of the power received by the power reception coil 22 with the first voltmeter 51. Accordingly, when the vehicle 10 is stopped and the relay switch 26 is off, the parking position determination processing is performed by using the voltage detected by the second voltmeter 52.

As described above, in the embodiment, the voltage is measured while switching the voltmeter to be used between the first voltmeter 51 and the second voltmeter 52 depending on whether the vehicle 10 is traveling (relay switch 26 is on) or is stopped (relay switch is off) and this improves the accuracy of voltage detection and allows the parking position determination processing to be accurately performed.

[Description of Operations in Embodiment]

Figure 3:
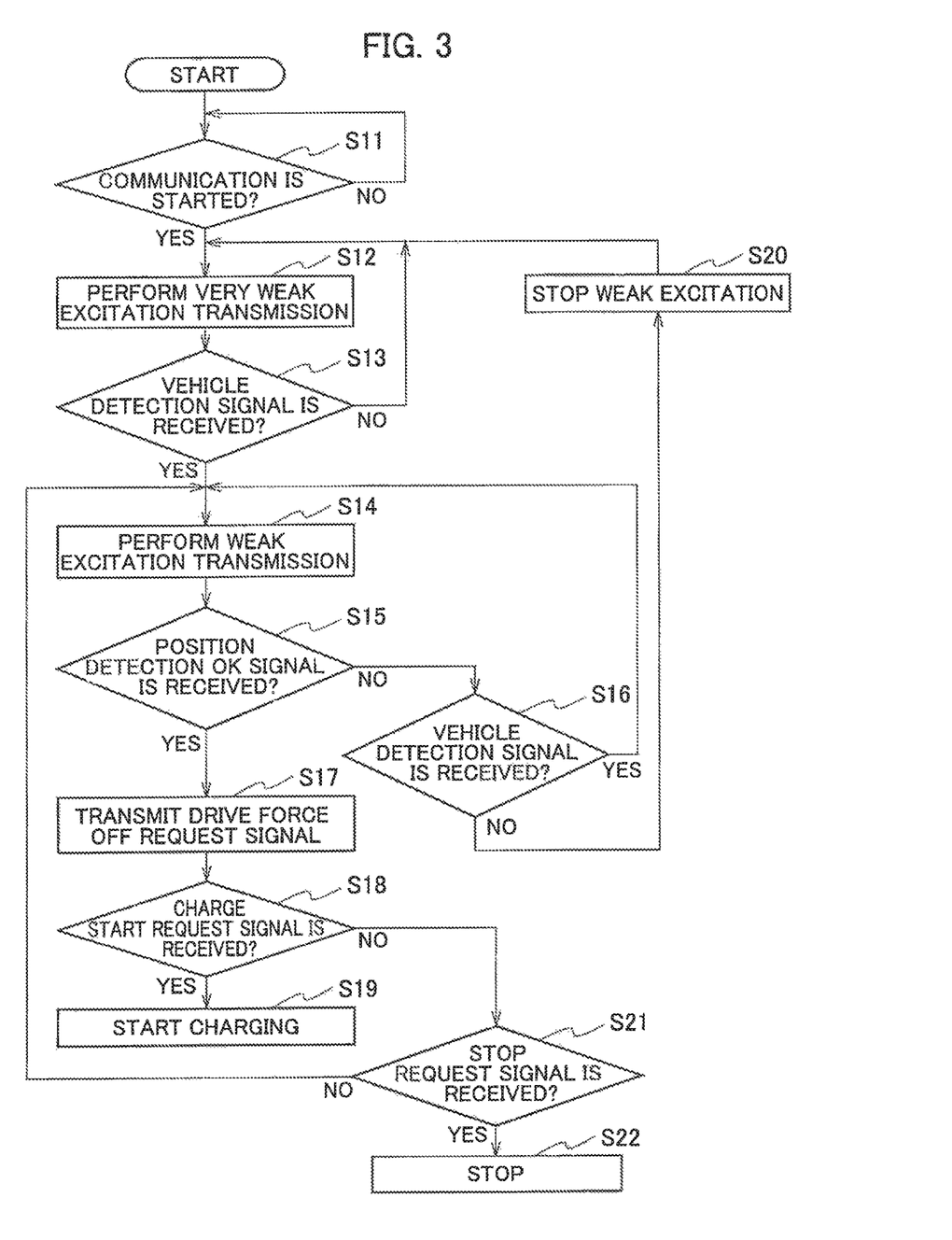
FIG. 3 is a flowchart illustrating processing steps performed by a power supply device in the coil position detection method according to one embodiment of the present invention.
Figure 4:
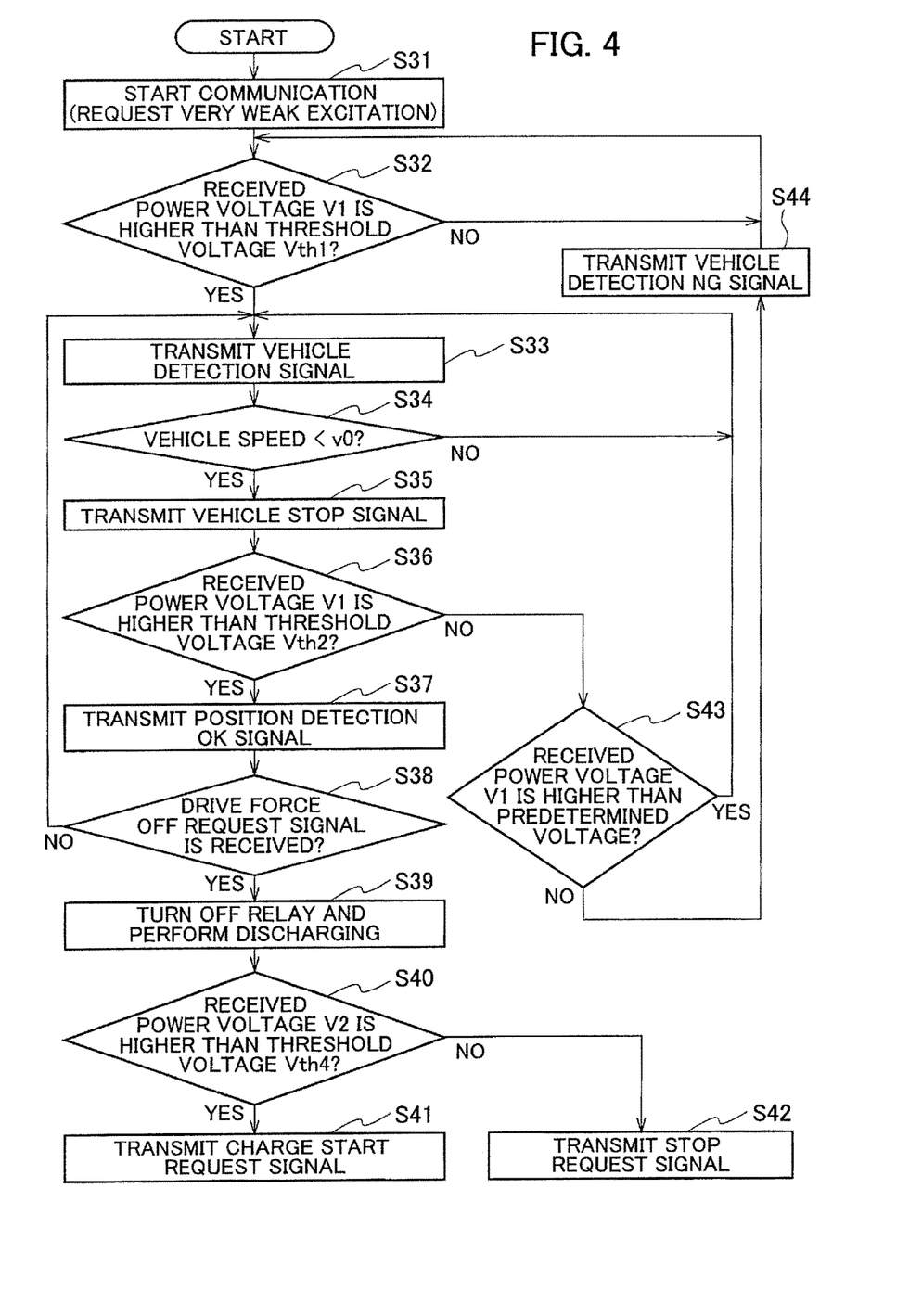
FIG. 4 is a flowchart illustrating processing steps performed by the power reception device when a vehicle is traveling in the coil position detection method according to one embodiment of the present invention.
Figure 5:
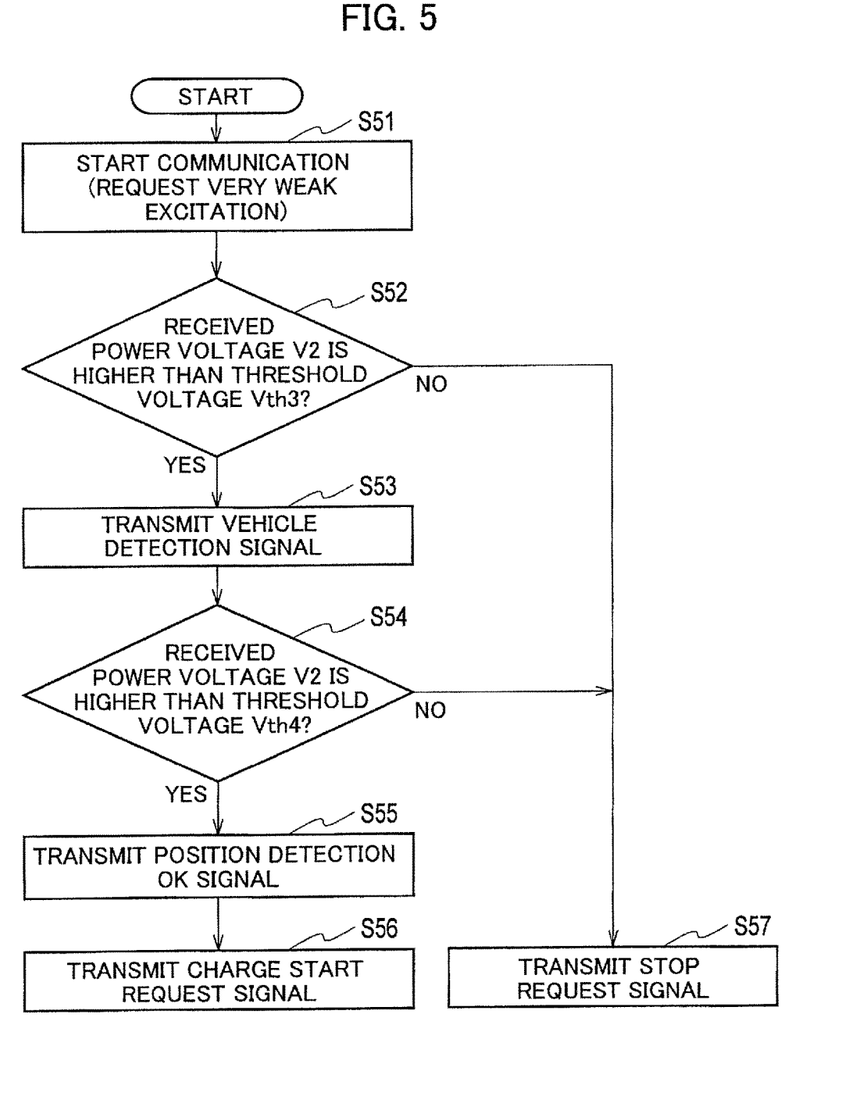
FIG. 5 is a flowchart illustrating processing steps performed by the power reception device when the vehicle is stopped in the coil position detection method according to one embodiment of the present invention.

Next, operations of the non-contact power supply system according to the embodiment are described with reference to the flowcharts illustrated in FIGS. 3 to 5. FIG. 3 is a flowchart illustrating processing steps performed by the power supply device 100 provided on the ground side. FIGS. 4 and 5 are flowcharts illustrating processing steps performed by the power reception device 200 provided in the vehicle 10. FIG. 4 illustrates processing steps performed when the vehicle is traveling and FIG. 5 illustrates processing steps performed when the vehicle is stopped.

First, the processing steps of the power supply device 100 are described with reference to FIG. 3. In step S11, the controller 14 of the power supply device 100 determines whether a very weak excitation request signal is obtained.

When the very weak excitation request signal is obtained, the controller 14 starts the communication. The very weak excitation request signal is a signal outputted by the power reception device 200 when the vehicle 10 approaches the parking space as described later.

When the communication is started (YES in step S11), in step S12, the controller 14 supplies power for the very weak excitation to the power transmission coil 12 to very weakly excite the power transmission coil 12.

In step S13, the controller 14 determines whether a vehicle detection signal transmitted by the power reception device 200 of the vehicle 10 is received. When the voltage received by the power reception coil 22 reaches the aforementioned first threshold voltage Vth1, the radio communication unit 23 transmits the vehicle detection signal.

When no vehicle detection signal is received (NO in step S13), the controller 14 returns the processing to step S12. When the vehicle detection signal is received (YES in step S13), in step S14, the controller 14 weakly excites the power transmission coil 12. Specifically, the voltage detected at the power reception coil 22 reaching the first threshold voltage Vth1 means that the power reception coil 22 reaches a position partially overlapping the power transmission coil 12 and, in this case, the power reception device 200 transmits the vehicle detection signal (see S33 in FIG. 4 to be described later). Then, when the vehicle detection signal is detected, the controller 14 switches the excitation of the power transmission coil 12 from the very weak excitation to the weak excitation.

In step S15, the controller 14 determines whether the vehicle 10 reaches a chargeable position (position where the coupling coefficient reaches the allowable coupling coefficient) in the parking space. This can be determined based on whether a position detection OK signal transmitted by the power reception device 200 is received. When the vehicle 10 does not reach the chargeable position (NO in step S15), the controller 14 causes the processing to proceed to step S16. When the vehicle 10 reaches the chargeable position (YES in step S15), the controller 14 causes the processing to proceed to step S17.

In step S16, the controller 14 determines whether the vehicle detection signal is transmitted by the power reception device 200. When the vehicle detection signal is transmitted (YES in step S16), the controller 14 returns the processing to step S14. This processing is performed, for example, when the vehicle 10 is approaching the chargeable position in the parking space 2 but has not reached the chargeable position yet, and the weak excitation is continuously performed in this case. Meanwhile, when no vehicle detection signal is transmitted (NO in step S16), in step S20, the controller 14 stops the weak excitation and returns the processing to step S12. This processing is performed, for example, when the parking space 2 is to be changed or when no non-contact power supply is to be performed, that is when the vehicle 10 moves away from the parking space 2, and the controller 14 stops the weak excitation.

In step S17, the controller 14 determines that the vehicle 10 is stopped at the chargeable position in the parking space 2 and transmits a drive force off request signal to the power reception device 200 to start the non-contact power supply. The drive force off request signal is a request signal for causing the vehicle 10 to stop drive of the inverter 28 and the motor 29.

In step S18, the controller 14 determines whether a charge start request signal (S41 of FIG. 4 to be described later) transmitted by the power reception device 200 is received. Then, when the charge start request signal is received (YES in step S18), in step S19, the controller 14 starts the charging. Specifically, the controller 14 excites the power transmission coil 12 to supply power for non-contact power supply.

Meanwhile, when no charge start request signal is received (NO in step S18), in step S21, the controller 14 determines whether a stop request signal (S42 of FIG. 4 to be described later) is transmitted by the power reception device 200. When no stop request signal is transmitted (NO in step S21), the controller 14 returns the processing to step S14. Meanwhile, when the stop request signal is transmitted (YES in step S21), the controller 14 stops the processing in step S22.

As described above, in the power supply device 100, the excitation is switched between the very weak excitation and the weak excitation depending on the positional relationship between the vehicle 10 and the parking space 2 and the non-contact power supply is started when the vehicle 10 reaches the chargeable position.

Next, processing steps performed by the power reception device 200 when the vehicle 10 travels to stop at the chargeable position in the parking space 2 are described with reference to the flowchart illustrated in FIG. 4.

First, in step S31 of FIG. 4, the charge controller 24 of the power reception device 200 starts communication with the power supply device 100 on the ground side and transmits the very weak excitation request signal to the power supply device 100. This communication is performed between the radio communication unit 23 and the radio communication unit 13 illustrated in FIG. 1. The communication start in this case can be triggered by a manual operation of a user, a start-up of an automatic parking system, searching by the power reception device 200, and the like. As a result, the power transmission coil 12 is very weakly excited (see S12 of FIG. 3).

In step S32, the voltage determiner 241 of the charge controller 24 obtains received power voltage V1 detected by the first voltmeter 51. The received power voltage V1 is the AC voltage generated in the power reception coil 22. Then, the voltage determiner 241 determines whether the received power voltage V1 is higher than the preset first threshold voltage Vth1.

When the received power voltage V1 is lower than the first threshold voltage Vth1 (NO in step S32), the charge controller 24 returns the processing. When the received power voltage V1 is higher than the first threshold voltage Vth1 (YES in step S32), in step S33, the charge controller 24 transmits the vehicle detection signal indicating that the vehicle 10 is detected in the parking space 2. Transmitting the vehicle detection signal causes the excitation of the power transmission coil 12 to be switched from the very weak excitation to the weak excitation (see S13 and S14 of FIG. 3).

In step S34, the charge controller 24 determines whether the vehicle speed falls below threshold speed v0. The vehicle speed is supplied by a not-illustrated vehicle speed sensor. Here, the threshold speed v0 is a very low speed at which the vehicle 10 travels to align with a certain position in the parking space 2. Note that the charge controller 24 may determine that the vehicle speed falls below the threshold speed v0 by detecting that the shift position of the vehicle 10 is set to parking.

When the vehicle speed does not fall below the threshold speed v0 (NO in step S34), the charge controller 24 returns the processing to step S33. Meanwhile, when the vehicle speed falls below the threshold speed v0 (YES in step S34), in step S35, the charge controller 24 transmits a vehicle stop signal to the radio communication unit 23.

Next, in step S36, the charge controller 24 determines whether the received power voltage V1 detected by the first voltmeter 51 is higher than the second threshold voltage Vth2.

When the received power voltage V1 is lower than the second threshold voltage Vth2 (NO in step S36), in step S43, the charge controller 24 determines whether the received power voltage V1 is higher than preset predetermined voltage. The "predetermined voltage" is minimum voltage generated in the power reception coil 22 when the power transmission coil 12 is weakly excited and the power reception coil 22 at least partially overlaps the power transmission coil 12. When the received power voltage V1 is higher than the predetermined voltage (YES in step S43), the charge controller 24 returns the processing to step S33. Meanwhile, when the received power voltage V1 is lower than the predetermined voltage (NO in step S43), the charge controller 24 determines that the vehicle 10 is far away from the parking space and transmits a vehicle detection NG signal in step S44. Then, the charge controller 24 returns the processing to step S32. Specifically, the received power voltage V1 falling below the aforementioned predetermined voltage means that the vehicle 10 has moved away from the parking space 2, and the charge controller 24 determines that a driver has changed the parking space 2 or no longer has the intention of power supply, and transmits the vehicle detection NG signal.

In step S37, the charge controller 24 determines that the vehicle 10 is stopped at the chargeable position in the parking space 2, and transmits the position detection OK signal. As a result, the position detection OK signal is transmitted from the radio communication unit 23 to the radio communication unit 13 (see FIG. 1) (see S15 of FIG. 3).

In step S38, the charge controller 24 determines whether the drive force off request signal of the vehicle 10 is transmitted by the power supply device 100 and is received. Specifically, the charge controller 24 determines whether the drive force off request signal is transmitted in the processing of step S17 of FIG. 3.

When no drive force off request signal is received (NO in step S38), the charge controller 24 returns the processing to step S33. When the drive force off request signal is received, the charge controller 24 causes the processing to proceed to step S39.

In step S39, the charge controller 24 turns off the relay switch 26 and performs processing of discharging the smoothing capacitor C3 (see FIG. 2). As a result, neither the voltage of the battery 27 nor the voltage of the smoothing capacitor C3 is applied to the second voltmeter 52.

Next, in step S40, the voltage determiner 241 of the charge controller 24 obtains received power voltage V2 detected by the second voltmeter 52. The received power voltage V2 is DC voltage obtained after rectifying the AC voltage generated in the power reception coil 22 with the rectifier circuit 53. Then, the voltage determiner 241 determines whether the received power voltage V2 is higher than the preset fourth threshold voltage Vth4.

When the received power voltage V2 is higher than the fourth threshold voltage Vth4 (YES in step S40), the vehicle 10 is stopped at the chargeable position in the parking space 2 and the non-contact power supply is possible. Accordingly, in step S41, the charge controller 24 transmits the charge start request signal to the power supply device 100 (see S18 of FIG. 3). Meanwhile, when the received power voltage V2 is lower than the fourth threshold voltage Vth4 (NO in step S40), for example, when a gap between the power transmission coil 12 and the power reception coil 22 increases due to alighting of passengers, the non-contact power supply cannot be performed. Accordingly, in step S42, the charge controller 24 transmits the stop request signal (see S21 of FIG. 3).

As described above, when the vehicle 10 is traveling (the relay switch 26 is on) while approaching the parking space 2 to perform the non-contact power supply, the charge controller 24 determines whether the vehicle 10 reaches the power suppliable position by using the received power voltage V1 detected by the first voltmeter 51. Meanwhile, when the vehicle 10 is stopped and the relay switch 26 is set to off, the charge controller 24 determines whether the vehicle 10 is stopped at the power suppliable position by using the received power voltage V2 detected by the second voltmeter 52.

Accordingly, it is possible to accurately detect the voltage of the power received by the power reception coil 22 and to accurately detect that the vehicle 10 is stopped at the power suppliable position and perform the non-contact power supply.

Next, processing steps performed by the power reception device 200 when the vehicle is stopped are described with reference to the flowchart illustrated in FIG. 5. This processing is processing performed when the non-contact power supply is performed for the vehicle 10 while the vehicle is stopped in the parking space 2. Note that the relay switch 26 is off.

First, in step S51 of FIG. 5, the charge controller 24 of the power reception device 200 starts communication with the power supply device 100 on the ground side and transmits the very weak excitation request signal to the power supply device 100. This processing is the same as that in S31 of FIG. 4.

In step S52, the voltage determiner 241 of the charge controller 24 obtains the received power voltage V2 detected by the second voltmeter 52. The received power voltage V2 is voltage downstream of the rectifier circuit 53 and is DC voltage. Then, the voltage determiner 241 determines whether the received power voltage V2 is higher than the preset third threshold voltage Vth3.

When the received power voltage V2 is lower than the third threshold voltage Vth3 (NO in step S52), the charge controller 24 transmits the stop request signal in step S57.

When the received power voltage V2 is higher than the third threshold voltage Vth3 (YES in step S52), in step S53, the charge controller 24 transmits the vehicle detection signal indicating that the vehicle 10 is detected. Transmitting the vehicle detection signal causes the excitation of the power transmission coil 12 to be switched from the very weak excitation to the weak excitation (see S14 of FIG. 3).

In step S54, the charge controller 24 determines whether the received power voltage V2 detected by the second voltmeter 52 is higher than the fourth threshold voltage Vth4.

When the received power voltage V2 is lower than the fourth threshold voltage Vth4 (NO in step S54), in step S57, the charge controller 24 transmits the stop request signal. Specifically, when the received power voltage V2 detected by the second voltmeter 52 is lower than the third threshold voltage Vth3 (NO in S52) and is lower than the fourth threshold voltage Vth4 (NO in S54), the non-contact power supply cannot be performed at the current stop position of the vehicle 10 and the charge controller 24 thus transmits the stop request signal. Such a situation may occur, for example, when the vehicle 10 is stopped at the chargeable position in the parking space 2 and then the vehicle moves due to some reason or the gap between the power transmission coil 12 and the power reception coil 22 increases due to alighting of the passenger.

Meanwhile, when the received power voltage V2 is higher than the fourth threshold voltage Vth4 (YES in step S54), in step S55, the charge controller 24 transmits the position detection OK signal. Then, in step S56, the charge controller 24 transmits the charge start request signal. The aforementioned processing of step S18 in FIG. 3 is performed in response to this charge start request signal and the non-contact power supply is started.

As described above, when the vehicle 10 is stopped at the parking space 2 to perform the non-contact power supply (when the relay switch 26 is off), the charge controller 24 determines whether the vehicle 10 is at the power suppliable position by using the received power voltage V2 detected by the second voltmeter 52. Accordingly, it is possible to accurately detect the voltage of the power received by the power reception coil 22 and to accurately detect that the vehicle 10 is stopped at the power suppliable position and perform the non-contact power supply.

[Description of Effects of Embodiment]

As described above, in the non-contact power supply system 1 according to the embodiment, when the vehicle 10 is stopped and the relay switch 26 is off the received power voltage is detected based on the voltage detected by the second voltmeter 52 provided downstream of the rectifier circuit 53. Moreover, when the vehicle 10 is traveling, the received power voltage is detected based on the voltage detected by the first voltmeter 51 provided upstream of the rectifier circuit 53. Accordingly, it is possible to accurately detect the voltage generated in the power reception coil 22 without switching the state of the relay switch 26 when the power transmission coil 12 is very weakly excited or weakly excited. As a result, the vehicle 10 can be accurately aligned.

[Description of Modified Examples]

Although the configuration is such that the first voltmeter 51 is provided between the two input terminals of the rectifier circuit 53 and the second voltmeter 52 is provided between the two output terminals of the rectifier circuit 53 as illustrated in FIG. 2 in the aforementioned embodiment, the present invention is not limited to this configuration. There is no need to limit the positions of the voltmeters to these positions as long as the voltage on the input side and the voltage on the output side can be measured.

Figure 6:
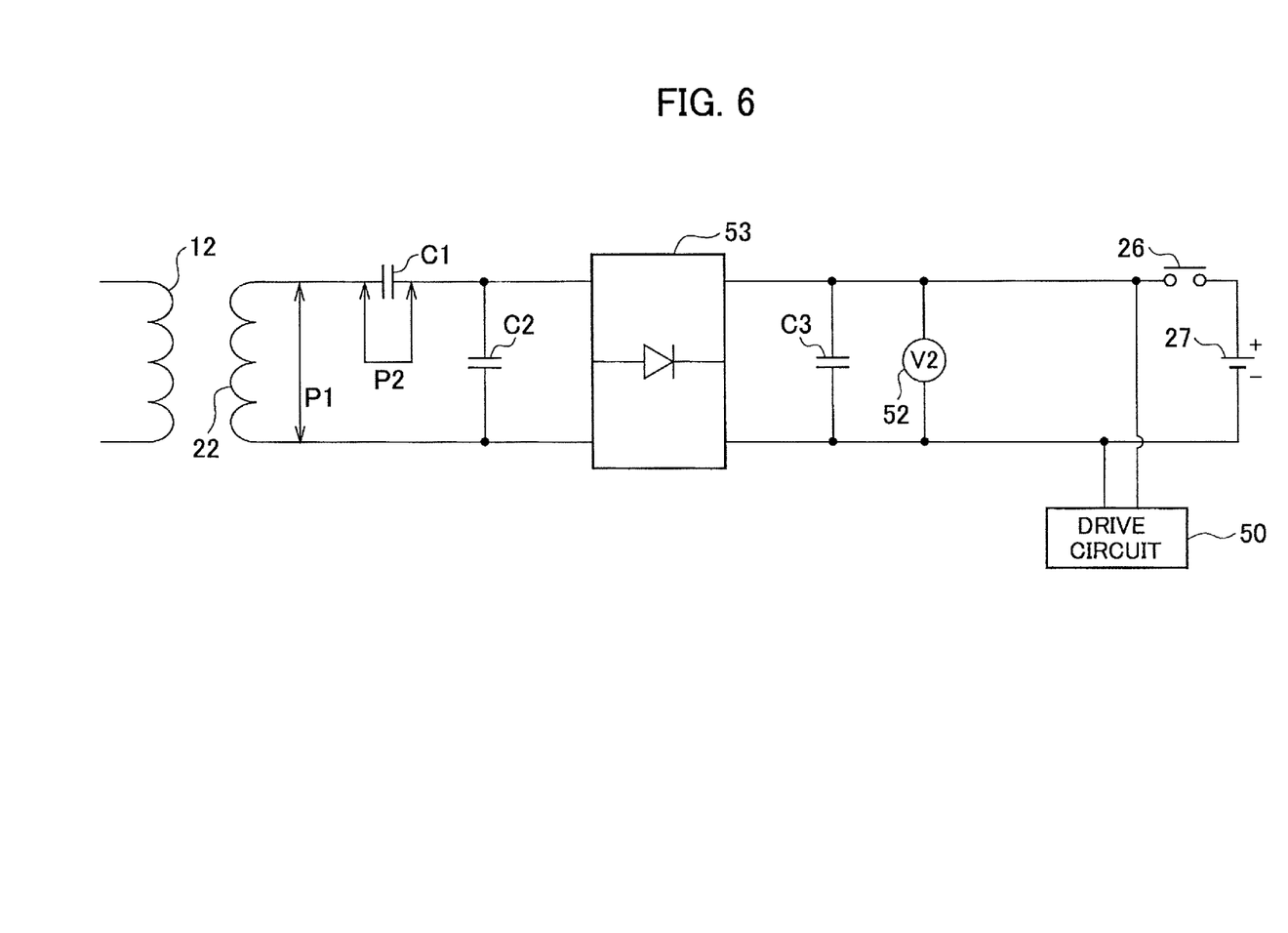
FIG. 6 is an explanatory view illustrating a first modified example of an installation location of a first voltmeter.

For example, as illustrated in FIG. 6, the voltmeter can be provided between two terminals of the power reception coil 22 (reference numeral P1) or between both ends of the capacitor C1 (reference numeral P2).

Figure 7:
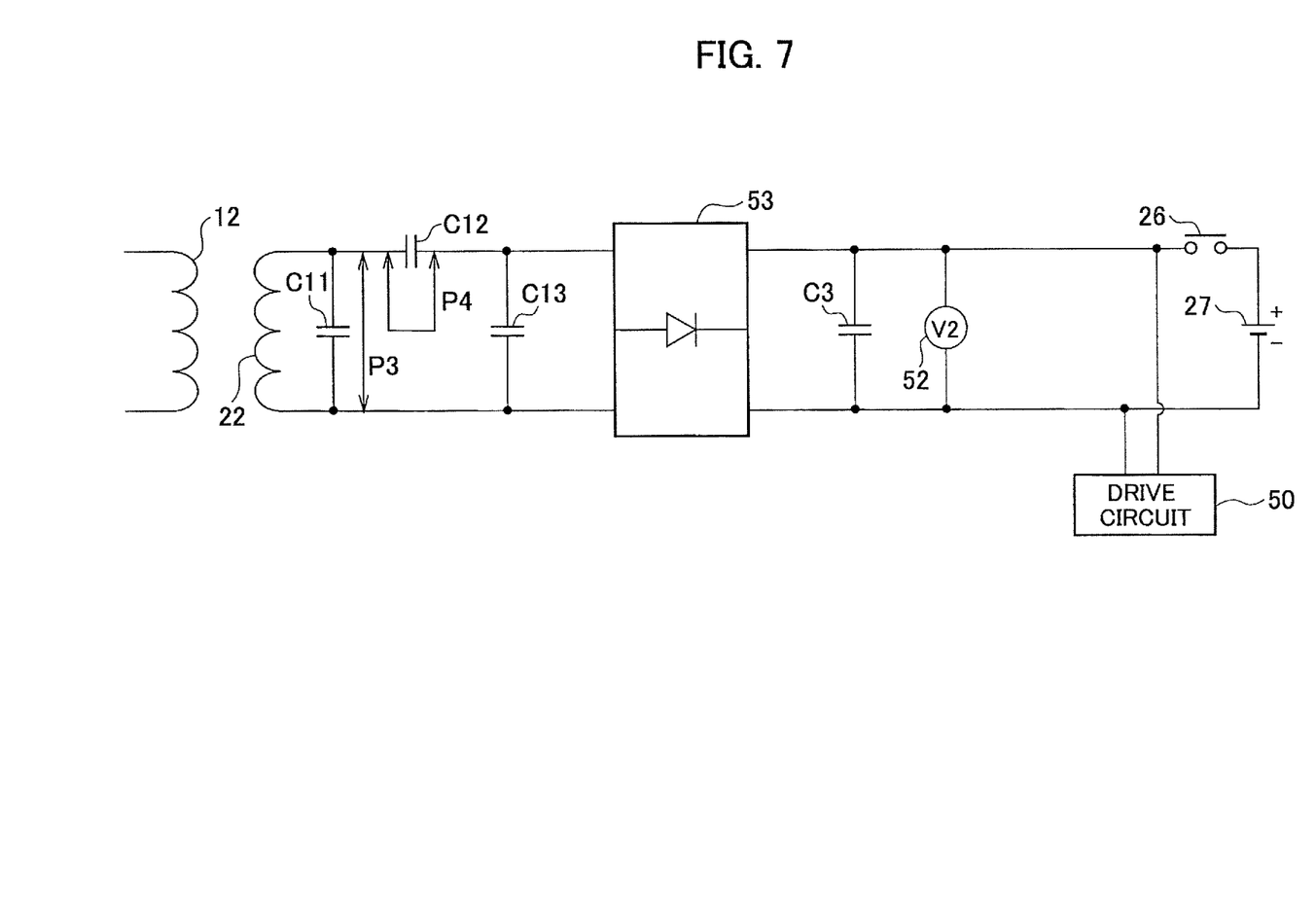
FIG. 7 is an explanatory view illustrating a second modified example of the installation location of the first voltmeter.
Figure 8:
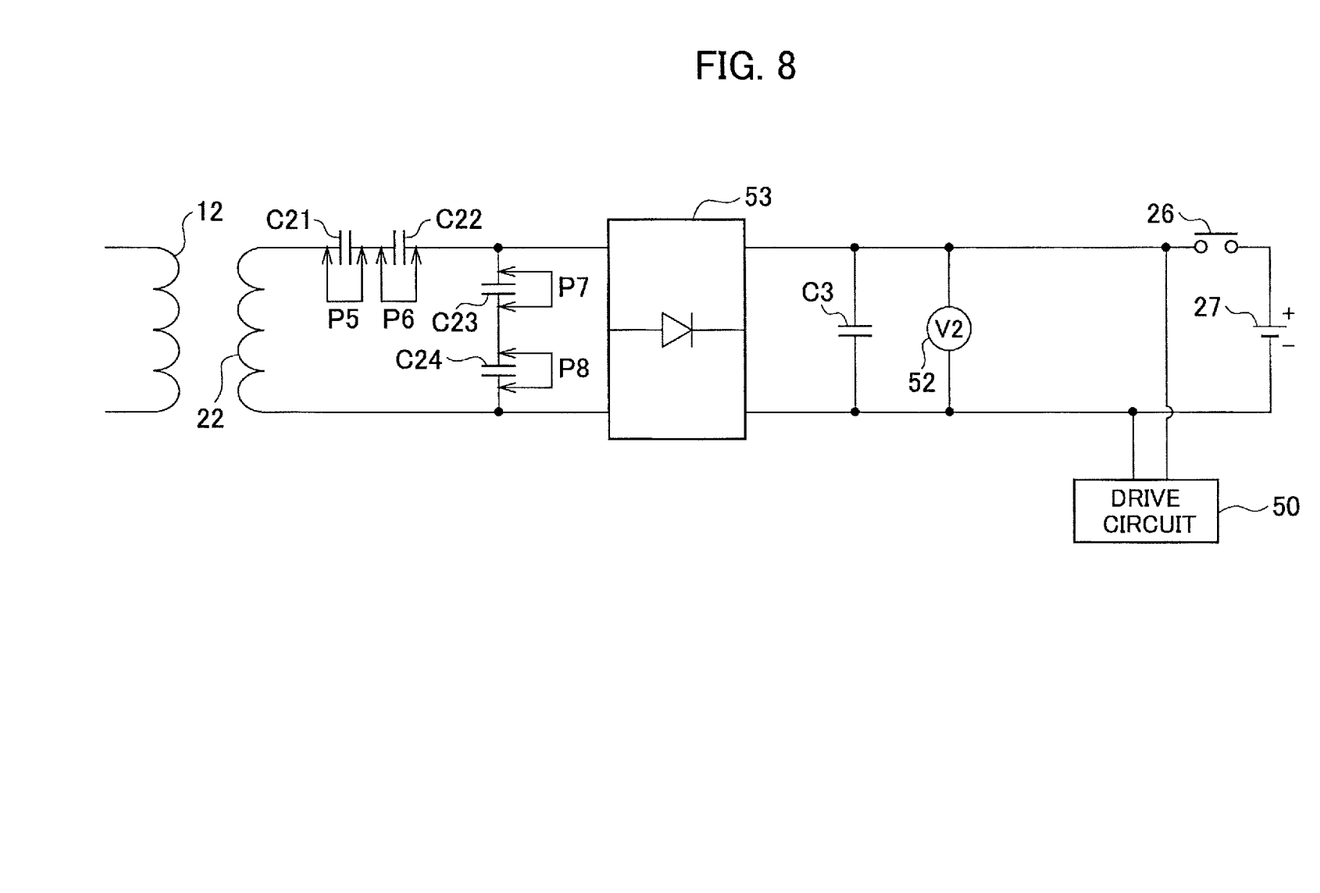
FIG. 8 is an explanatory view illustrating a third modified example of the installation location of the first voltmeter.

Moreover, as illustrated in FIG. 7, the configuration may be such that three capacitors C11, C12, and C13 are provided for the power reception coil 22 and the voltmeter is provided between both terminals (reference numeral P3) of the capacitor C11 or between both terminals (reference numeral P4) of the capacitor C12. Furthermore, as illustrated in FIG. 8, the configuration may be such that four capacitors C21, C22, C23, and C24 are provided and the voltmeter is provided between both terminals (reference numerals P5 to P8) of any of the capacitors C21 to C24.

Furthermore, in the aforementioned embodiment, the configuration is such that the first voltmeter 51 is provided between the two input terminals of the rectifier circuit 53 and the second voltmeter 52 is provided between the two output terminals of the rectifier circuit 53 as illustrated in FIG. 2. In this case, the voltage of the power received by the power reception coil 22 varies between the case where the power transmission coil 12 is very weakly excited and the case where the power transmission coil 12 is weakly excited. Accordingly, as illustrated in FIGS. 9 and 10, the received power voltage in each excited state can be measured with dividing resistors inserted.

Figure 9:
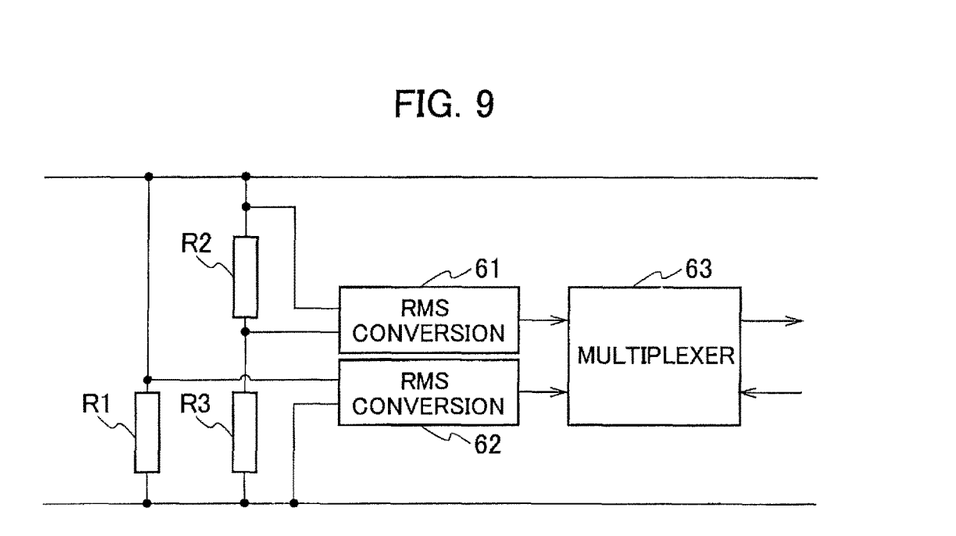
FIG. 9 is an explanatory view illustrating a first example of dividing of detected voltage performed when the voltage is detected by the first voltmeter or a second voltmeter.

As illustrated in FIG. 9, a resistance R1 and a circuit of serially-connected resistances R2 and R3 are inserted between two buses. Then, in the very weak excitation, voltage generated between both terminals of the resistance R1 is detected and subjected to RMS conversion in a RMS conversion circuit 62. Meanwhile, in the weak excitation, voltage generated between both ends of the resistance R2 is detected and subjected to RMS conversion in a RMS conversion circuit 61. Then, a signal outputted from each of the RMS conversion circuits 61 and 62 is outputted by using a multiplexer circuit 63. This allows the level of the outputted voltage to be adjusted within a certain range when the received power voltage detected in the very weak excitation and the received power voltage detected in the weak excitation differ from each other.

For example, when the received power voltage detected in the weak excitation is a numerical value ten times the received power voltage detected in the very weak excitation, the resistance value of the resistance R3 is set to about ten times the resistance value of the resistance R2. As a result, it is possible to reduce the dynamic range in the voltage detection in the voltage determiner 241 illustrated in FIG. 1.

Figure 10:
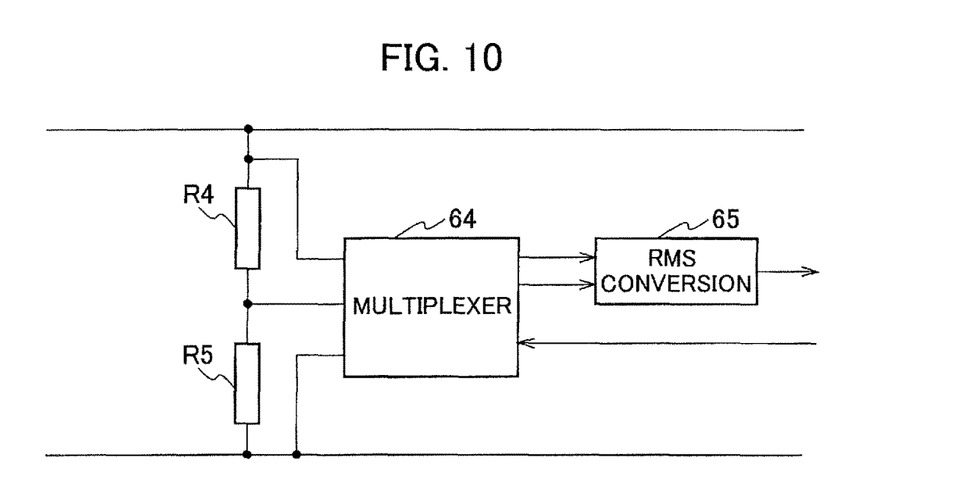
FIG. 10 is an explanatory view illustrating a second example of dividing of the detected voltage performed when the voltage is detected by the first voltmeter or the second voltmeter.

Moreover, as illustrated in FIG. 10, a circuit of serially connected resistances R4 and R5 are inserted between two buses. In this case, the resistance value of the resistance R4 is smaller than the resistance value of the resistance R5. In other words, R4<R5. In the very weak excitation, voltage between both terminals of the resistance R5 is detected and, in the weak excitation, voltage between both terminals of the resistance R4 is detected. Then, the voltage is transmitted to a RMS conversion circuit 65 via a multiplexer 64 and then subjected to RMS conversion in the RMS conversion circuit 65. For example, when the received power voltage detected in the weak excitation is a numerical value ten times the received power voltage detected in the very weak excitation, the resistance value of the resistance R5 may be set to about ten times the resistance value of the resistance R4.

Also in this configuration, it is possible to reduce the dynamic range in the voltage detection in the voltage determiner 241 as in the aforementioned circuit illustrated FIG. 9. Specifically, it is possible to reduce the dynamic range in the voltage determiner 241 by providing a voltage divider circuit with two or more voltage division ratios different from each other upstream of the rectifier circuit 53 and detecting the voltage while switching voltage division ratio to be applied depending on a change in the excitation of the power transmission coil 12.

Although the coil position detection method for the non-contact power supply system and the power reception device of the present invention have been described above based on the illustrated embodiment, the present invention is not limited to these and the configurations of the parts can be replaced by any configurations having similar functions.

REFERENCE SIGNS LIST

1 non-contact power supply system
2 parking space
10 vehicle
11 power controller
12 power transmission coil
13 radio communication unit
14 controller
22 power reception coil
23 radio communication unit
24 charge controller
25 rectifier
26 relay switch (relay circuit)
27 battery
28 inverter
29 motor
50 drive circuit
51 first voltmeter
52 second voltmeter
53 rectifier circuit
61, 62, 65 RMS conversion circuit
63, 64 multiplexer
100 power supply device
110 AC power supply
111 rectifier
112 PFC circuit
113 inverter
114 DC power supply
141 inverter controller
142 PFC controller
143 sequence controller
200 power reception device
241 voltage determiner
C3 smoothing capacitor

The invention claimed is:

1. A coil position detection method for a non-contact power supply system configured to supply power from a power transmission coil on a ground side to a power reception coil on a vehicle side, by which a position of the power reception coil is detected, comprising:
when a relay circuit is on such that a battery is connected to a rectifier circuit configured to rectify AC power received by the power reception coil and to a drive circuit connected to the rectifier circuit, detecting the coil position based on AC voltage detected upstream of the rectifier circuit, wherein the relay circuit is provided between the battery and the rectifier circuit as well as the drive circuit; and
when the relay circuit is off such that the battery is disconnected from the rectifier circuit and from the drive circuit, detecting the coil position based on DC voltage detected downstream of the rectifier circuit.

2. The coil position detection method for the non-contact power supply system according to claim 1, wherein
a voltage divider circuit with two or more voltage division ratios different from each other is provided upstream of the rectifier circuit, and
the voltage is detected with the voltage division ratio to be applied changed depending on a change in excitation of the power transmission coil.

3. A power reception device comprising:
a power reception coil configured to contactlessly receive AC power transmitted from a power transmission coil on a ground side;
a rectifier circuit configured to rectify the AC power received by the power reception coil;
a drive circuit connected to the rectifier circuit;
a battery configured to store DC power obtained through rectification by the rectifier circuit;
a relay circuit provided between the battery and the rectifier circuit as well as the drive circuit; and
a coil position detection circuit configured to detect a position of the power reception coil by detecting voltage of power received by the power reception coil when the power transmission coil is excited, wherein the coil position detection circuit is further configured to:

detect the position of the power reception coil based on AC voltage detected upstream of the rectifier circuit when the relay circuit is on such that the battery is connected to the rectifier circuit and to the drive circuit; and detect the position of the power reception coil based on DC voltage detected downstream of the rectifier circuit when the relay circuit is off such that the battery is disconnected from the rectifier circuit and from the drive circuit.

* * * * *